3,163,599
PROCESS OF DESCALING SEA WATER
Murrell L. Salutsky, Silver Spring, Md., and Maria G. Dunseth, Arlington, Va., assignors to W. R. Grace & Co., New York, N.Y., a corporation of Connecticut
Filed Jan. 21, 1963, Ser. No. 252,887
2 Claims. (Cl. 210—47)

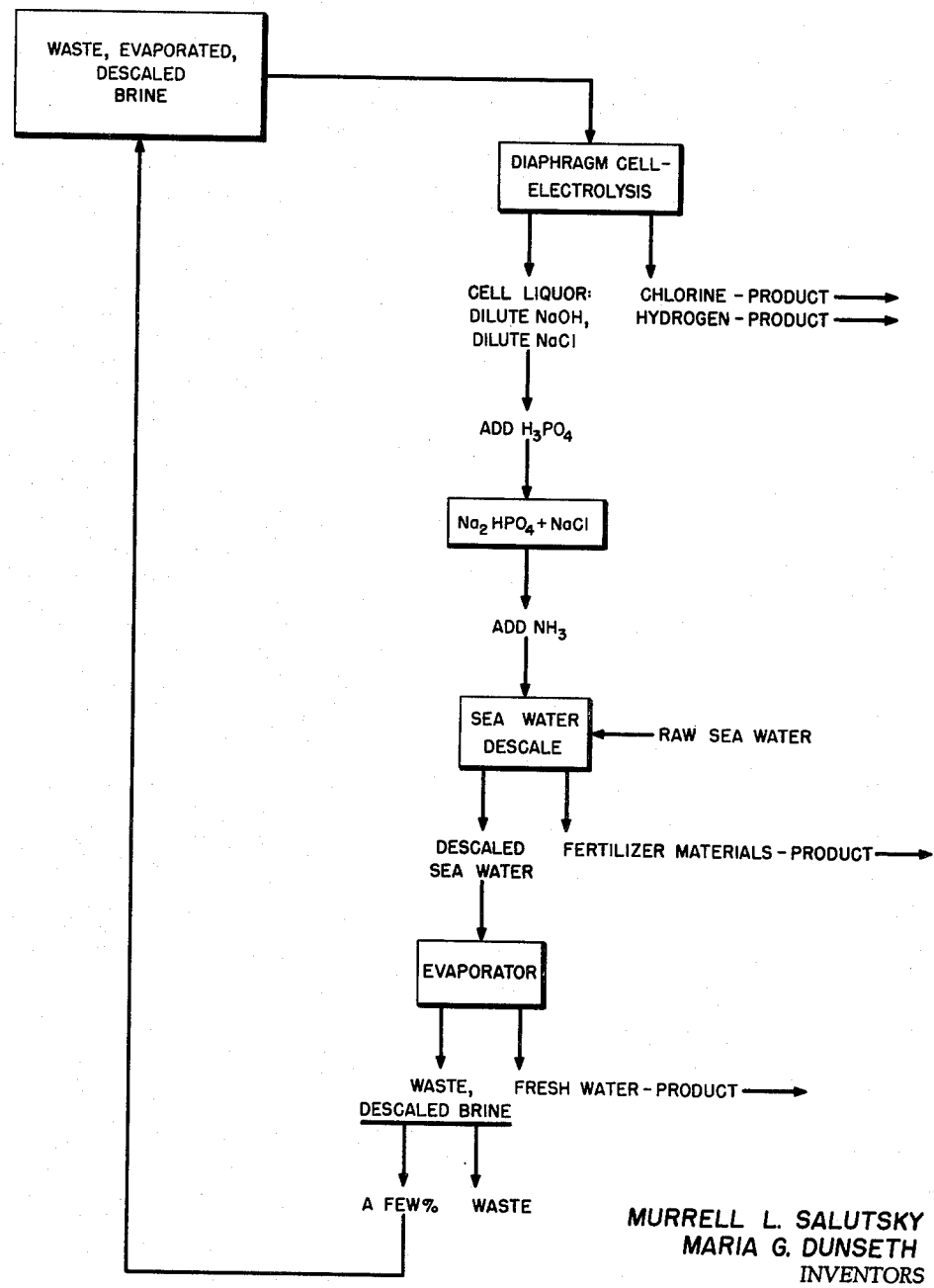
Dec. 29, 1964    M. L. SALUTSKY ETAL    3,163,599
PROCESS OF DESCALING SEA WATER
Filed Jan. 21, 1963
MURRELL L. SALUTSKY
MARIA G. DUNSETH
INVENTORS
BY *Ann G. Leibowitz*
AGENT

This invention relates to the treatment of metallic cation-containing brines, such as sea water. In one aspect, the invention relates to a method for the preparation of sodium hydroxide and chlorine from concentrated waste brine. In another aspect, this invention relates to a method for utilizing waste, descaled concentrated brine as a source of low cost neutralizing agent in descaling sea water.

Sea water contains a fairly high concentration of metal salts which are scale-forming, such as magnesium and calcium. In almost any treatment of sea water, if these cations are not removed, they form metallic salts which are left behind with the result that the concentration of solids within the apparatus being used increases and a large amount of scale is accumulated. This reduces the efficiency of the apparatus and requires periodic shutdown for cleaning.

It is known that a successful method for the descaling of sea water can be provided by adding phosphoric acid and ammonia to the sea water in the necessary proportions for the precipitation of magnesium ammonium phosphate, dicalcium phosphates, and other phosphates. This process is indicated in the following reactions:

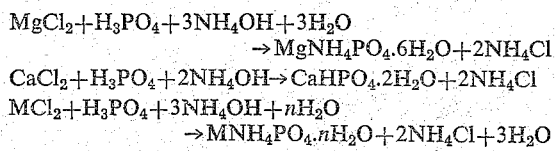

where M signifies divalent element such as Fe, Zn, Cu, Mn, and Ni. The precipitation of the offending cations as metal ammonium phosphates is particularly desirable when the uses for them are taken into consideration. Probably the most important of these is in the fertilizer industry, inasmuch as these compounds are non-burning to plants, thereby rendering them highly desirable as fertilizer materials.

However, the descaling procedure outlined above has the disadvantage of a large ammonia requirement, and much of the ammonia so used is lost as ammonium chloride. A more economical descaling procedure involves the reaction of disodium phosphate and ammonia, in accordance with the following reactions:

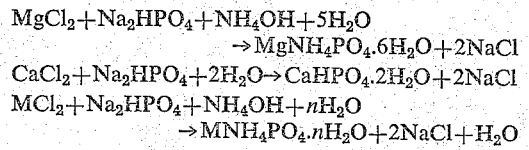

This procedure is dealt with at length in U.S. Patent No. 3,042,616, to Salutsky and Bridger, "Descaling Sea Water."

One method for carrying the latter procedure out is to simply add disodium phosphate as a starting material, along with ammonia to the raw sea water. It is known that the simplest method for producing sodium phosphates involves the neutralization of phosphoric acid with sodium hydroxide, provided some waste or low cost source of alkali is available.

One of the most common industrial methods for the production of sodium hydroxide depends on the electrolysis of brine in a diaphragm cell. The products of the electrolysis are chlorine, hydrogen, and a dilute solution of sodium hydroxide and sodium chloride called cell liquor. The brine used in the cell must be free of impurities, such as calcium and magnesium (primarily the same elements which form scale during the desalination of sea water) because these impurities foul the cell. In the commercial production of sodium hydroxide by this method, a large fraction of the cost of the final material is expended after the electrolysis procedure is complete, in the concentration, separation, and purification of the alkali.

It is an object of this invention, therefore, to provide a scheme for the low-cost production of alkali which could be used in the preparation of sodium phosphates for sea water descaling. It is a further object of this invention to provide an overall scheme for the descaling of sea water wherein the final commercial products obtained are in addition to descaled sea water, chlorine, hydrogen, and fertilizer materials and the by-products are recycled and re-used. It is still a further object of this invention to develop a method for using waste descaled concentrated brine, produced in the sea water evaporation process, as a source of low-cost neutralizing agent in the descaling of sea water. Other objects will become obvious from the following discussion and description.

We have found that the sodium hydroxide required for the formation of sodium phosphates in the sea water descaling process need not be of high purity or concentration, and further, that the dilute solution of sodium hydroxide and sodium chloride resulting from the electrolysis of descaled sea water is entirely suitable for this purpose. As a result, we have developed a cyclic process for the production of chlorine and metal phosphate fertilizer materials from sea water. This process can be readily understood by a consideration of the following discussion and by reference to the accompanying drawing.

Waste, descaled sea water or concentrated waste brine is first electrolyzed in a suitable electrolytic cell. Chlorine gas is collected at one electrode and hydrogen at the other, leaving behind, as the cell liquor, a dilute solution of sodium hydroxide and sodium chloride. Thereafter, phosphoric acid is added to the cell liquor until all of the sodium hydroxide has been converted to disodium phosphate. The resulting mixture of disodium phosphate and sodium chloride is then added directly to a suitable quantity of raw sea water, along with ammonia, to precipitate calcium phosphate and metal ammonium phosphates. The descaled water is then directed to an evaporator, where by conventional techniques, fresh water is produced. A few percent of the residual concentrated descaled brine left in the evaporator is returned to the electrolytic cell to become the starting material for the next cycle. The actual quantity will depend upon the concentration of the original calcium and magnesium to be removed.

The electrolytic cell used to develop the process described had two compartments separated by an asbestos diaphragm. In one compartment chlorine was generated on a graphite electrode. In the other compartment, sodium was generated on a graphite electrode. In the other compartment, sodium was generated on a platinum electrode. The sodium reacted with the water in this compartment, forming sodium hydroxide and hydrogen. In order to test the operability of the cell, sodium chloride solutions of different concentrations were electrolyzed in the diaphragm cell for various periods of time. The concentration of sodium chloride ranged from 35 grams of sodium chloride per 100 milliliters of water (saturated brine) to 3 grams of sodium chloride per 100 milliliters of water (approximately the concentration of sea water). Table I shows the data obtained in these experiments.

TABLE I

*Electrolysis of Sodium Chloride Solutions of Various Concentrations at Constant Amperage*

| No. | g. NaCl/100 ml. | Vol. of NaOH Compartment (ml.) | Temperature Range (° C.) | Time, Minutes | Equivalents NaOH | Milli-equivalents of NaOH/ml. | Percent Current Efficiency | Percent Energy Efficiency | Percent NaOH |
|---|---|---|---|---|---|---|---|---|---|
| 1 | 35.0 | 181 | 47 | 10 | 0.0593 | 0.327 | 96.5 | 42.8 | 1.31 |
| 2 | 35.0 | 231 | 50-56 | 60 | 0.2737 | 1.184 | 74.2 | 31.2 | 4.74 |
| 3 | 35.0 | 119 | 43-60 | 56 | 0.2054 | 1.726 | 59.7 | 25.1 | 6.90 |
| 4 | 17.5 | 220 | 54 | 10 | 0.0554 | 0.252 | 89.8 | 39.9 | 1.00 |
| 5 | 17.5 | 223 | 60-65 | 60 | 0.237 | 1.061 | 64.1 | 23.3 | 4.24 |
| 6 | 17.5 | 115 | 51-67 | 80 | 0.218 | 1.902 | 44.5 | 16.2 | 7.60 |
| 7 | 8.25 | 214 | 53-55 | 10 | 0.0528 | 0.247 | 85.8 | 28.6 | 0.98 |
| 8 | 8.25 | 139 | 55-62 | 81 | 0.1718 | 1.236 | 34.9 | 14.0 | 4.94 |
| 9 | 8.25 | 180 | 53-60 | 120 | 0.2482 | 1.378 | 33.6 | 13.5 | 5.52 |
| 10 | 3.0 | 176 | 55-69 | 10 | 0.0415 | 0.236 | 67.5 | 13.6 | 0.94 |
| 11 | 3.0 | 196 | 53-65 | 10 | 0.0412 | 0.210 | 66.7 | 13.3 | 0.85 |
| 12 | 3.0 | 199 | 51-62 | 60 | 0.1167 | 0.587 | 31.6 | 12.7 | 2.34 |

It is apparent from the data in Table I that although a 3% NaCl solution (the approximate concentration of naturally occurring sea water) can be used in the instant invention, as the NaCl solution approaches saturation, the efficiency of the electrolysis is markedly increased. Hence, although the concentration of the waste, descaled brine to be electrolyzed is not critical, the process operates most efficiently when a highly concentrated solution is employed.

It must be kept in mind that the percent current and energy efficiencies are closely related to the type and design of cell used. The cell described above is only one of the many types suitable for the desired electrolysis. With regard to final alkali concentrations, the only goal is to obtain a sufficient quantity of sodium hydroxide so that an adequate supply of disodium phosphate can be prepared. This is achieved by controlling the current through the cell and the total time allotted to electrolysis. The key to the quantities of all of the starting materials in the cycle must be found in the relative proportions of offending metallic cations in the water to be treated. For raw sea water, this can be summarized as follows in Table II.

TABLE II

*Basic Sea Water Concentration of Selected Cations*

| | Parts per Million | Lb./1,000 gallons (Approximate) |
|---|---|---|
| Magnesium | 1,272 | 10.9 |
| Calcium | 400 | 3.4 |
| Iron | 0.02 | $7 \times 10^{-4}$ |
| Manganese | 0.01 | $8.6 \times 10^{-5}$ |
| Copper | 0.01 | $8.6 \times 10^{-5}$ |
| Zinc | 0.005 | $4.3 \times 10^{-5}$ |

These values further determine the quantities of phosphoric acid and ammonia to be added. It must also be kept in mind that the starting material may well be more or less concentrated with respect to these cations, depending upon its source, allowance must be made for this in deciding upon final concentrations and quantities.

For raw sea water having the concentrations given above, each liter to be descaled would require at least 7.1 grams of $Na_2HPO_4$ and .73 gram of ammonia. This entails using sufficient cell liquor to neutralize about 5 grams of $H_3PO_4$ to $Na_2HPO_4$. Naturally, the exact quantity of cell liquor would depend upon the final sodium hydroxide concentration therein.

It is important in the chlor-alkali industry for economical operation of the diaphragm cells to balance sales of chlorine and caustic soda. Frequently, as is true at present, in the United States the demand for chlorine exceeds that of caustic soda. By the invention described above, while chlorine is obtained as a product, the caustic soda produced is routed directly to descaling and fertilizer production. Consequently, greater economical production of chlorine results.

From the foregoing description, it can be appreciated that we have been able to successfully devise an economical process whereby chlorine is produced from waste, descaled brine and the remaining cell liquor is efficiently used in the descaling of brine. Further, it can be seen that we have developed a cyclic procedure wherein phosphoric acid, ammonia, and sea water are appropriately combined so as to result in chlorine and fertilizer production with no ammonia waste and no undesirable by-product.

We claim:

1. A cyclic process for the descaling of sea water comprising the steps of:
   (a) electrolyzing concentrated waste brine which is free from scale-forming elements in a diaphragm cell;
   (b) recovering the resulting cell liquor;
   (c) adding to said cell liquor a quantity of phosphoric acid, such that disodium phosphate is quantitatively formed from the sodium hydroxide contained therein;
   (d) adding to said disodium phosphate solution a sufficient quantity of ammonia to precipitate the scale-forming elements in a predetermined quantity of sea water;
   (e) adding said solution to said predetermined quantity of sea water, thereby precipitating said scale-forming elements;
   (f) separating the precipitate from the mother liquor;
   (g) recovering said mother liquor of descaled sea water; and
   (h) evaporating said mother liquor to obtain fresh water and a residuum of concentrated, descaled brine; and
   (i) recycling said concentrated descaled sea water to step (a) above.

2. A cyclic process for the simultaneous production of chlorine and fertilizer values and descaling of sea water comprising the steps of:
   (a) electrolyzing concentrated waste brine which is free from scale-forming elements in a diaphragm cell;
   (b) collecting and recovering chlorine gas at the positive electrode of said diaphragm cell;
   (c) recovering the cell liquor from said diaphragm cell;
   (d) adding to said cell liquor a quantity of phosphoric acid, such that disodium phosphate is quantitatively formed from the sodium hydroxide contained therein;
   (e) adding to said disodium phosphate solution a stoichiometric quantity of ammonia to precipitate the scale-forming elements in a predetermined quantity of sea water, as calcium phosphate and metal ammonium phosphates;

(f) adding to said solution said predetermined quantity of sea water, thereby precipitating said calcium phosphate and metal ammonium phosphate;
(g) separating and recovering said calcium phosphate and metal ammonium phosphates from the mother liquor;
(h) recovering said mother liquor of descaled sea water;
(i) evaporating said mother liquor to obtain fresh water and a residuum of concentrated, descaled brine; and
(j) recycling said residuum of concentrated, descaled brine to step (a) above.

References Cited in the file of this patent
UNITED STATES PATENTS

| | | |
|---|---|---|
| 2,967,807 | Osborne et al. | Jan. 10, 1961 |
| 3,042,606 | Salutsky et al. | July 3, 1962 |